United States Patent [19]

Han

[11] Patent Number: 6,094,577

[45] Date of Patent: Jul. 25, 2000

[54] METHOD FOR FAULT DIAGNOSIS OF A RF RECEIVE PATH IN A CDMA DIGITAL CELLULAR BASE-STATION SYSTEM

[75] Inventor: Deog-Soo Han, Sungnam, Rep. of Korea

[73] Assignee: Samsung Electronics Co., Ltd., Rep. of Korea

[21] Appl. No.: 09/109,474

[22] Filed: Jul. 2, 1998

[30] Foreign Application Priority Data

Jul. 2, 1997 [KR] Rep. of Korea ........................ 97-30552

[51] Int. Cl.[7] ........................................................ H04Q 7/00
[52] U.S. Cl. ............................................ 455/424; 455/67.4
[58] Field of Search ................................... 455/423, 424, 455/425, 507, 517, 67.1, 67.4, 226.1, 226.4; 375/224, 225, 226

[56] References Cited

U.S. PATENT DOCUMENTS 5,481,186   1/1996   Heutmaker et al. ................... 455/67.4
5,640,401   6/1997   Yamada .
5,930,707   7/1999   Vambaris et al. ........................ 455/424
5,943,617   8/1999   Nakamura ................................ 455/424

*Primary Examiner*—Thanh Cong Le
*Attorney, Agent, or Firm*—Dilworth & Barrese

[57] ABSTRACT

A method is provided for fault diagnosis of a receive path in a CDMA digital cellular base station system. The receive path includes a receive front-end stage, a transceiver unit stage and an IF amplify & divide unit stage. The method includes the steps of connecting the RF receive path to a base station test unit, supplying a transmit signal of a test mobile station unit installed in the base station test unit to the RF receive path, measuring a receiver signal level, establishing a criterion for diagnosing a fault in the RF receiver path and determining whether a fault occurs in one 8 the receive front-end stage, the transceiver unit and the IF amplify & divide unit stage, respectively.

20 Claims, 5 Drawing Sheets

6,094,577

METHOD FOR FAULT DIAGNOSIS OF A RF RECEIVE PATH IN A CDMA DIGITAL CELLULAR BASE-STATION SYSTEM

BACKGROUND OF THE INVENTION

1. Field of the Invention

The present invention relates to a method for fault diagnosis of a RF receive path in a cellular base station system, and more particularly, this invention relates to a method for diagnosing and localizing a fault in a receive unit of a digital cellular base station system.

2. Description of the Related Art

Both PCS and CDMA systems include a plurality of Base station Transceiver Subsystems (BTS) which offer a service to mobile stations, a Base Station Controller (BSC), a Base Station Manager system (BSM), a Mobile Switching Center (MSC) and a Location Registering System (LRS).

An area is called a cell where each base station offers a service and the cell is divided into several sectors. The coverage of the cell is expanded into a BTS area, a BSC area and a MSC area in order. A mobile station within each cell forms a channel with a BTS, which offers a service to the cell, performing communication. It is a forward channel that is formed from a base station toward a mobile station and a reverse channel that is formed from a mobile station toward a base station. Mobile stations transmit and receive voice information and data with a base station through a traffic channel.

In a mobile communication system, the subsystems under a mobile switching center are called base station subsystems (hereafter abbreviated as BSS). The BSS includes a base station manager system, base station controllers and base station transceiver subsystems in order of hierarchy. The main processor of the base station controller system is called a call control processor (hereafter abbreviated as CCP) and the main processor of the base station system is a BTS control processor (hereafter abbreviated as BCP).

A RF receive path in a CDMA digital cellular base station system refers to a path which receives a radio signal transmitted over a radio frequency (RF) from a mobile station. FIG. 1 is a block diagram illustrating a RF receive path in a typical CDMA digital cellular base station. As illustrated, a base station system 300 which offers service to mobile stations 200 includes an out-door system 90 having an antenna 10 which is coupled to the base station system via coaxial cable. The base station system 300 also includes an in-door system 80 which has RF transmitting and receiving equipment installed in the inner part of the base station.

The in-door system 80 includes a RF receive unit 50, a digital unit 60 and a base station test unit 70. The RF receive unit 50 generally includes a receive front-end stage 20, a transceiver unit stage 30 and an IF amplify & divide unit stage 40. The receive front-end stage 20 generally includes a receive front coupler, a band pass filter, a low noise amplifier and a power divider. Referring to FIG. 2, the transceiver unit 30 includes a receive down-converter board 410, a transceiver slave control board 420 and a transmit up-converter board 430. The digital unit 60 is generally formed with a digital signalling part.

The base station test unit 70 includes a RF switch unit (RSWU), an attenuator unit (ATTU) and a test mobile station unit (TSMU). The transceiver unit 30 can measure a level of a signal received through the antenna in the base station or the directional coupler of the receive front-end stage, directly connected to the antenna. FIG. 2 is a block diagram of a transceiver unit 30 in a receive path of a base station system. As illustrated, the transceiver unit 400 includes a receive down-converter board 410, a transmit up-converter board 430 and a transceiver slave control board 420. The receive down-converter board 410 includes a circuit for converting a received RF signal via a receive front-end stage into a receive intermediate frequency (IF) signal. The receive down-converter board 410 also includes an automatic gain controller (AGC) for maintaining a substantially constant receive IF level despite changes of the received RF input level.

The transceiver slave control board 420 monitors and controls circuit boards in the transceiver unit 400 such as the receive down-converter board 410, the transmit up-converter board 430, and itself. The transceiver slave control board 420 includes a microprocessor and a peripheral circuit. The transceiver slave control board 420 carries out functions such as setting a channel frequency of the corresponding transceiver unit 400, controlling an attenuator of a forward and a reverse link, storing the structure of a receive down-converter board and a transmit up-converter board, storing the fixed data about fluctuation of the variable attenuator, measuring a RF receive input signal intensity and monitoring a status of the transceiver unit 400.

The transmit up-converter board 430 includes a mixer circuit, a variable attenuator, a band pass filter and a local oscillator circuit. The mixer circuit converts a transmit IF signal transmitted from the digital signaling processor into a RF signal corresponding to a desired carrier frequency, in a manner well known in the art of RF circuit design.

In a CDMA digital cellular base station system, it is desirable to diagnose faults in an RF receive path in a base station during operation of the system. Such diagnostics are used to promptly detect faults and maintain system integrity. Therefore, a special fault diagnostic algorithm is needed for diagnosing the RF receive path.

Systems known in the prior art diagnose a fault in an outdoor base station system containing an antenna and a coaxial cable by measuring an antenna Voltage Standing Wave Ratio (VSWR). However, such systems are not generally applied to in-door base station systems and do not isolate faults within the indoor base station receiver.

U.S. Pat. No. 5,640,401 discloses a communication circuit fault detector. The disclosed fault detector temporarily stores a test signal generated from a sequence generator in a memory circuit and simultaneously inputs the test signal into the communication circuit. The fault detection circuit compares a returned test signal from the communication circuit with the test signal stored in the memory circuit. Unlike loop tests of the prior art, the invention disclosed in U.S. Pat. No. 5,640,401, tests a communication circuit during normal data communication. However, U.S. Pat. No. 5,640,401 is directed to fault detection of a general data communication circuit and does not teach a method for fault diagnosis of a receive path in a CDMA digital cellular base station.

SUMMARY OF THE INVENTION

The present invention provides a method for fault diagnosis of a RF receive path in a base station system using a base station test unit (BTU) installed in a CDMA digital cellular base station system.

To diagnose a fault of a RF receive path consisting of a receive front-end stage, a transceiver stage unit and a IF amplify & divide unit stage, one preferred embodiment of a method for fault diagnosis of a RF receive path in a CDMA cellular base station system includes the steps of: connecting the RF receive path with the base station test unit; supplying a signal transmitted from a test mobile station unit in the base station test unit to the RF receive path; measuring a received signal level; establishing a criterion for a fault diagnosis of the RF receive path; and determining whether a fault occurs in the receive front-end stage, the transceiver unit stage and the IF amplify & divide unit stage, by stages.

In accordance with a further method, another value is measured from the transceiver unit if the received signal level is below an expected value by more than a predetermined threshold value. Preferably, the newly measured value is an IF output signal level. The measured IF output signal level is then compared to a baseline IF voltage-level outputted from the transceiver unit when receiving a signal of known amplitude. This comparison is used for determining whether a fault occurs in the receive front-end stage or the transceiver unit. The fault being isolated to the receive front-end stage if the IF output voltage-level is normal while in the transceiver unit if the IF output voltage-level is abnormal.

In a further method, fault diagnosis is performed in the IF amplify & divide unit stage if a fault is detected in neither the receive front-end stage nor the transceiver unit. Preferably, a difference between a normal automatic gain control voltage and an abnormal automatic gain control voltage outputted from an automatic gain controller in an ACCA installed in the digital unit is used for diagnosing a fault of the IF amplify & divide unit stage.

These and other features, objects and advantages of the present invention will become apparent from the following detailed description of illustrative embodiments thereof, which is to be read in connection with the accompanying drawings.

BRIEF DESCRIPTION OF THE DRAWINGS

The invention will be described in detail in the following description of preferred embodiments with reference to the following figures, wherein.

DETAILED DESCRIPTION OF PREFERRED EMBODIMENTS

Figure 1:
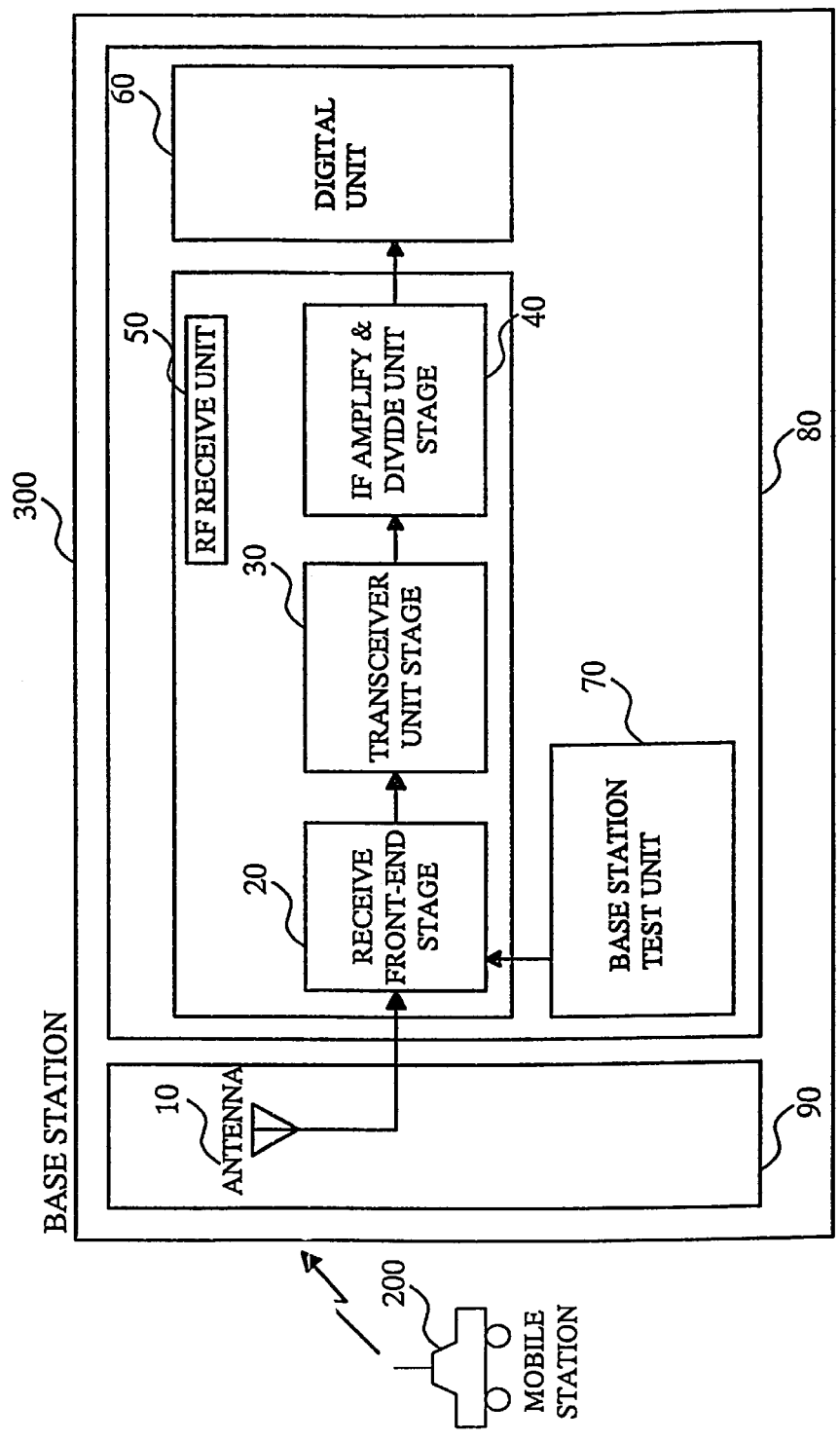
FIG. 1 is a block diagram of a RF receive path in a CDMA digital cellular base station.
Figure 2:
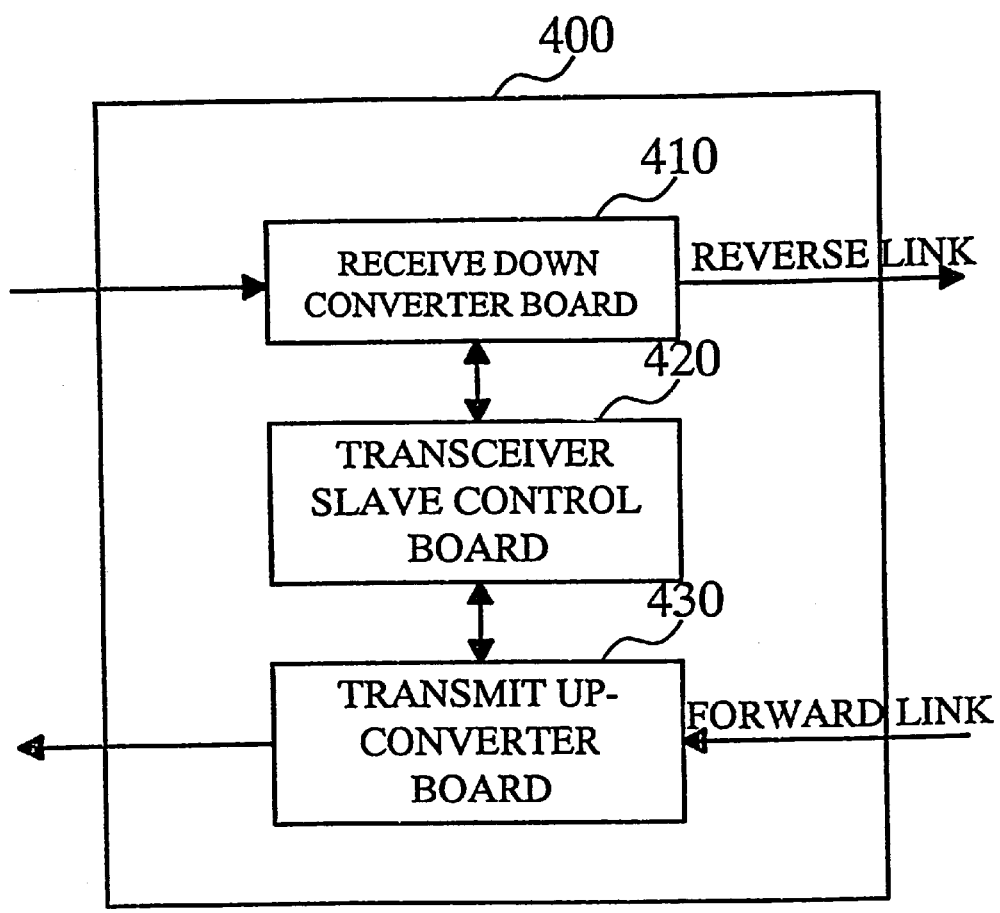
FIG. 2 is a block diagram of an exemplary transceiver unit known in the prior art.

As shown in FIG. 1, the RF receive path of a CDMA base station 300 is roughly divided into three stages: a receive front-end stage 20, a transceiver unit stage 30 and an IF amplify & divide unit stage 40. The present invention provides a diagnostic architecture and method wherein the RF receive path is tested and faults are isolated to one of the three stages. The system and method use a test mobile unit to generate a test signal. From the test signal, which has a well controlled amplitude, an expected RF signal level is ascertained and an IF signal level is stored as a baseline for subsequent measurements. Diagnostics are performed on subsequently received signals based on differences detected in the RF signal level, IF signal level and the condition of an AGC fault signal. Based on the conditions, a receive path fault is effectively located to one of the receive front-end stage 20, transceiver unit stage 30 and IF amplify & divide unit stage 400 of the base station 300.

Figure 3:
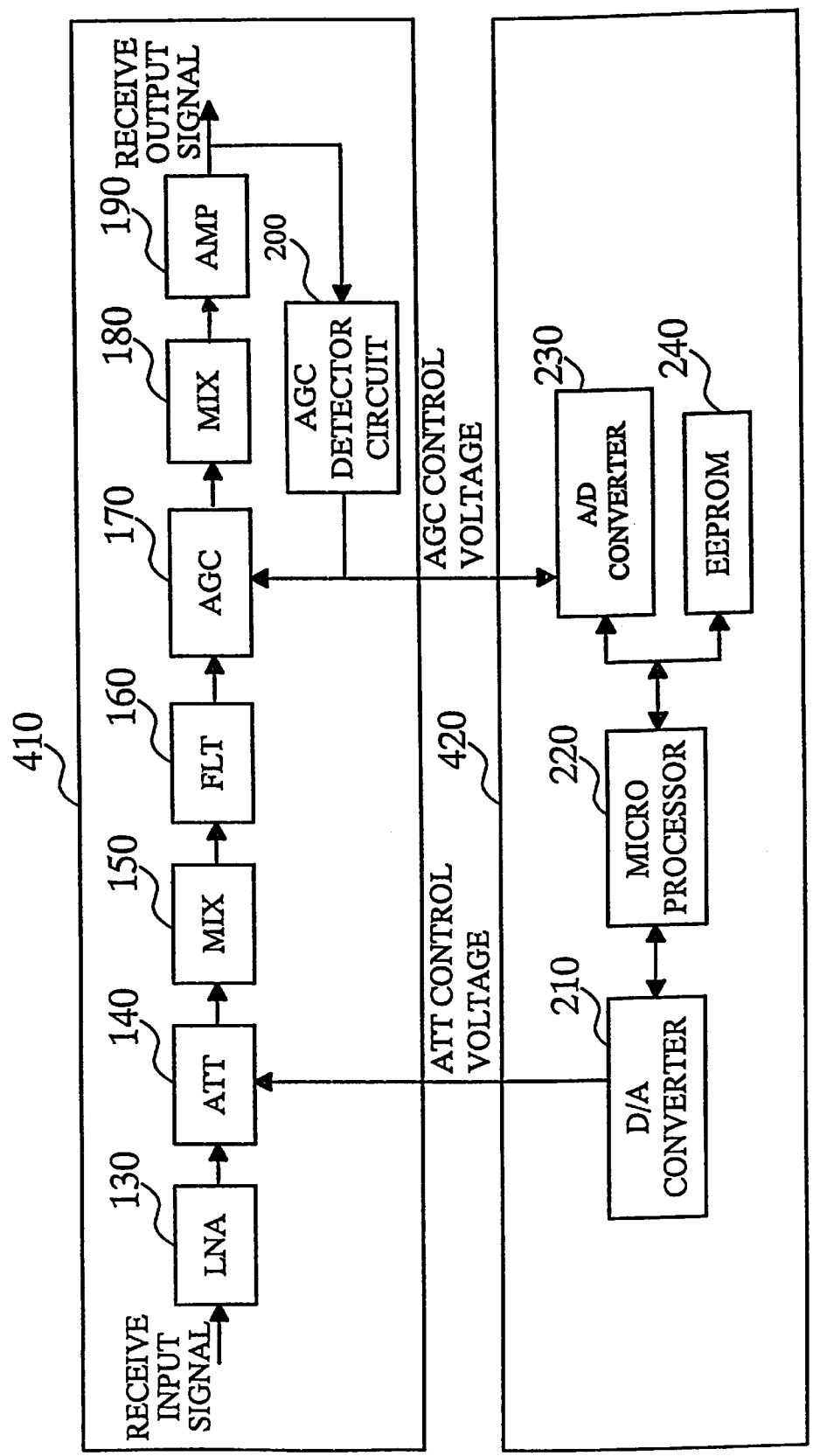
FIG. 3 is a block diagram of a receive down-converter board and a transceiver slave control board.

FIG. 3 is a block diagram further illustrating the topology of the receive down-converter board and transceiver slave control board 420 of the transceiver unit 400. As shown, the receive down-converter board 410 includes a first amplifier 130, a variable attenuator 140, a first mixer 150, a band pass filter 160, an automatic gain controller 170, a second mixer 180, a second amplifier 190 and an automatic gain control detector 200. The transceiver slave control board 420 preferably includes a digital/analog (D/A) converter 210, a microprocessor 220, an analog/digital (A/D) converter 230 and an EEPROM (Electronically Erasable Programmable Read Only Memory) 240. The A/D converter 230 is coupled to the AGC detector circuit 200 such that voltage measurements, corresponding to an input RF level, can be performed by the transceiver unit 400. The output of the A/D converter 230 is provided on a data bus for access by the microprocessor 220 and storage in the non-volatile memory, EEPROM 240.

Figure 4:
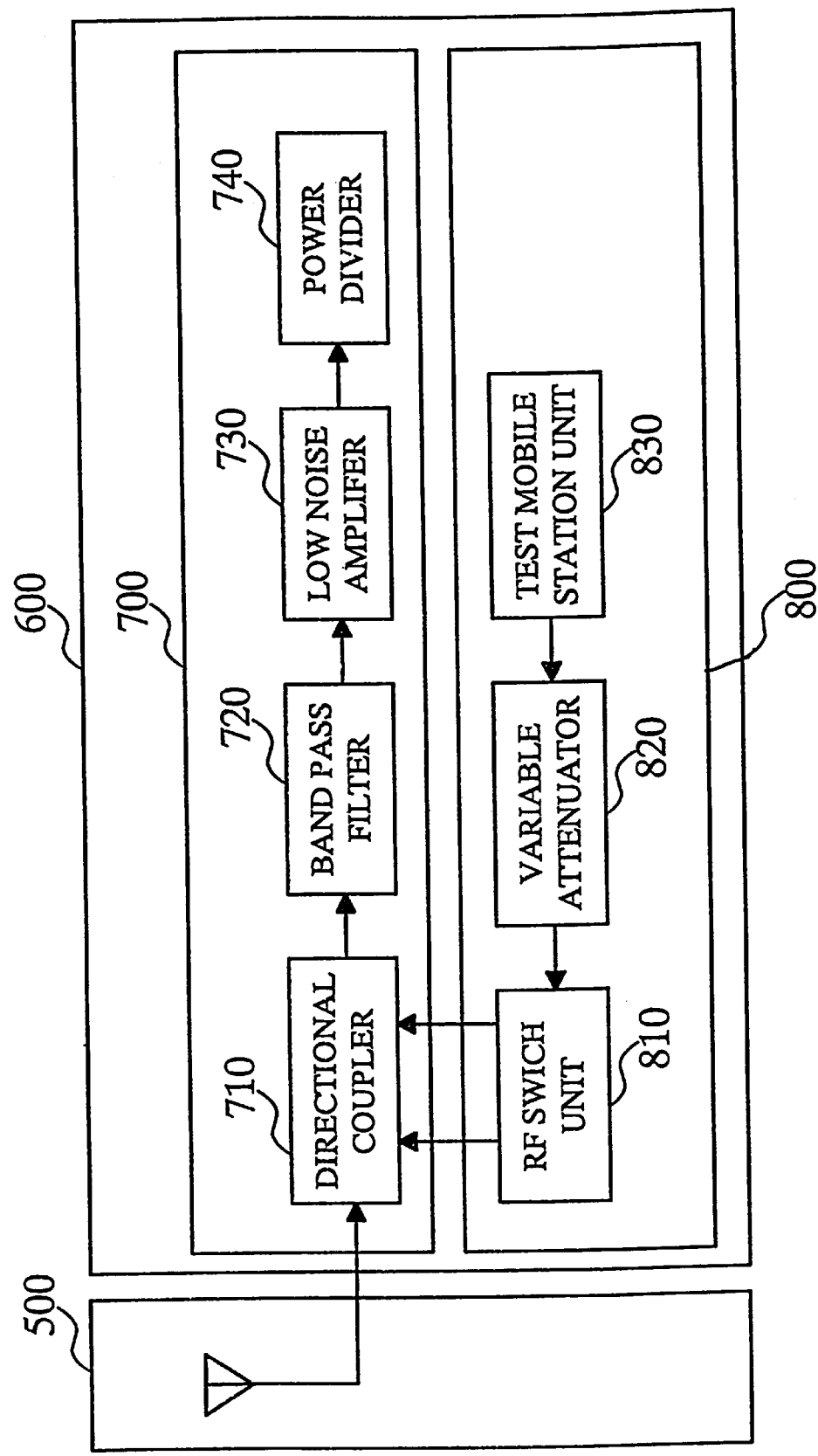
FIG. 4 is the detailed block diagram of a receive front-end stage and a base station test unit in a base station, formed in accordance with the present invention.

FIG. 4 is a block diagram of a receive front-end stage 700 and a base station test unit 800 in the base station 600. The receive front-end stage 700 preferably includes a directional coupler 710, a band pass filter 720, a low noise amplifier 730 and a power divider 740. The base station test unit 800 preferably includes an RF switch unit 810 connected to the directional coupler 710 of the receive front-end stage 700. The base station test unit 800 further includes a variable attenuator 820 which is interposed between the RF switch unit 810 and a test mobile station unit 830.

The directional coupler 710 has a coupling port for receiving an RF test signal from the base station test unit 800. The band pass filter 720 removes radio signals which are out of the desired pass band and passes desired signals from an RF input signal coupled to a receive antenna 500 in the base station or from the directional coupler 710. The low noise amplifier 730 receives and amplifies signals filtered through the band pass filter 720. The power divider 740 receives the amplified signal and divides the signal for routing to several transceiver units 400.

The RF switch unit 810 switches a forward/reverse link signal of each sector in transmit and receive paths and tests a switching function of the hardware path. The variable attenuator 820 performs variable attenuation in the transmit and receive path for coupling the test mobile station unit 830 to the RF switch unit 810. The test mobile station unit 830, unlike a usual mobile station, is connected to the base station over a cable through the RF switch unit 810 and the variable attenuator 820 in the base station test unit 800, rather than by transmission over a public network, such as an antenna. Preferably, the test mobile station unit 830, variable attenuator 820, RF switch unit 810 and all coupling coaxial cables are calibrated such that the RF level provided by the base station test unit 70 is a known reference value.

The test mobile station unit 830 is used for monitoring, diagnosing and testing. That is, a transmit signal of the test mobile station unit 830 is supplied to the RF receive unit 700 and is used for diagnosing a fault in the RF receive path in the base station. A transceiver unit 400 in the inner system of a base station precisely measures a receiver signal level transmitted over an antenna or a directional coupler 710 in the base station. According to a method of the present invention, the receive level measured in the transceiver unit is used for diagnosing a fault in the RF receive path.

The method of the present invention uses stored baseline date and current measurements to isolate a fault condition in a receive path. For example, if either the receive front-end stage 700 is malfunctioning or the transceiver unit 400 is malfunctioning, the gain of the receive path including the receive front-end stage 700 and the transceiver unit 400 is reduced. In such a case, the input signal level which the transceiver unit 400 measures is reduced accordingly. Therefore, reduced input signal level, as compared to an expected baseline value, can be used to diagnose the receive path. Such a fault condition can be diagnosed through the AGC detector circuit 200 in the receive down-converter board 410. However, because this process cannot resolve whether the fault is occurring in the receive front-end stage or transceiver unit, an additional diagnostic process is necessary for precise fault location.

The subsequent diagnostic process involves evaluating an IF signal level of the transceiver unit. The transceiver unit outputs a normal IF signal when receiving a high level signal (i.e., greater than or equal to about −80 dBm), but outputs a lower level signal than a normal IF when receiving a signal less than about −80 dBm. This signal level is reflected in a voltage present at the output of the automatic gain controller detector 200. The transceiver unit 400 senses the IF output signal level and provides the output signal level intensity as a voltage which can be measured by the A/D converter 230. The AGC detector voltage is steady when the transceiver unit 400 is operating normally. However, when a fault occurs in the transceiver unit 400 and the IF output signal level decreases, the AGC detector voltage changes accordingly. Therefore, by comparison of a stored AGC detector voltage level under normal conditions with the current AGC detector level voltage from the transceiver unit 400, the location of a fault in either the receive front-end stage 700 or the transceiver unit 400 is isolated.

If the receive front-end stage is functioning normally and a fault occurs in the transceiver unit, the IF level will be below the stored baseline value. However, if the receive front-end stage is malfunctioning, this will be reflected by the combination of reduced RF level and a normal AGC detector voltage output.

If a fault is not detected in either the receive front-end stage 700 or the transceiver unit 400, the present method performs a fault diagnosis of the IF amplify & divide unit stage 40. If a fault occurs in the IF amplify & divide unit stage 40, a received IF output signal level from the IF amplify & divide unit stage 40 is lower than that in the normal case. However, the transceiver unit can't detect the fault of the IF amplify & divide unit stage 40. Therefore, an Analog Common Card Assembly (ACCA) installed in the digital unit 60 must be employed.

The Analog Common Card Assembly (ACCA) is connected to the IF amplify & divide unit stage 40 and has an automatic gain controller for processing the received IF signal. This automatic gain controller controls the gain of the IF amplify & divide unit stage 40 according to the input IF signal level and outputs a voltage corresponding to the gain value. The automatic gain control voltage from the ACCA depends in part on whether or not a fault is present in the IF amplify & divide unit stage 40. Therefore, by checking a difference of the automatic gain control voltage between a normal case and a current case, a fault in the IF amplify & divide unit stage 40 can be diagnosed.

If the receive front-end stage 20, transceiver unit stage 30 and IF amplify & divide unit stage 40 all function normally, no fault is present in the receiver path of the indoor system of the base station.

Figure 5:
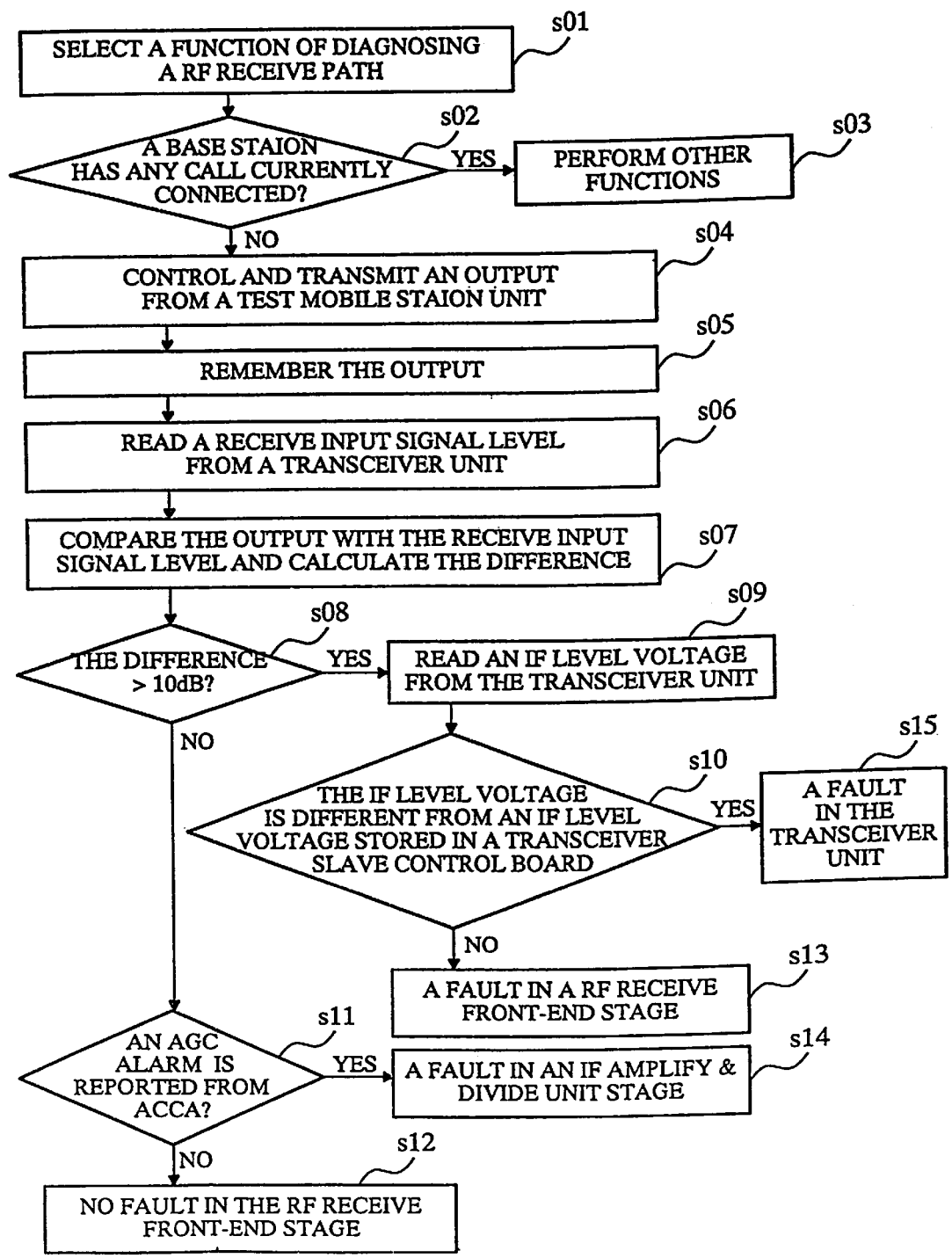
FIG. 5 is a flow diagram illustrating a method for fault diagnosis of a RF receive path in a base station in accordance with the present invention.

FIG. 5 is a flow diagram illustrating a method for fault diagnosis of a receive path in a base station according to the present invention. The method of FIG. 5 assumes that a signal was applied to the receive path when the system was operating normally and a resulting baseline IF signal level stored in memory. As illustrated in FIG. 5, the method for fault diagnosis begins with the step of selecting the fault diagnosis routine for the receive path in the base station (s01). The status of the base station is then checked to determine if any call is currently connected (s02). If a call is connected, the base station delays diagnostics and performs other functions (s03) which do not interfere with the call. If no call is connected, the output of a test mobile station unit 830 is set to a desired signal level and signals are transmitted from the test mobile station unit 830 (s04) to the base station. The signal level applied to the receiver is stored for later comparison (s05).

Next, a receiver input signal level is measured by the transceiver unit 30 (s06). This can be performed by the A/D converter 230 under the control of microprocessor 22. The received signal is compared to the stored output value of the test mobile station unit 830 and a difference between the received signal strength and expected signal strength is calculated (s07). The resulting difference is then tested to determine if the level of difference exceeds a predetermined threshold value, such as about 10 dB (s08).

When the difference determined in step s08 is greater than the threshold value (i.e., 10 dB), a measurement of an IF level voltage from the transceiver unit 30 is performed (s09) and this value is compared to the stored baseline IF level voltage measurement from the test mobile station unit 830 when the system was known to be operating normally (s10). If the two voltages are different in step s10, a fault is isolated in the transceiver unit 400 (s15). When the difference from step s08 is greater than 10 dB and the two voltages are the same in the step s10, a fault is then located in the receive front-end unit stage 700 (s13).

If the difference level does not exceed the threshold value (10 dB) in step s08, an AGC value is tested to determine whether a fault is reported from the ACCA (s11). If an ACG fault condition is reported in step s11, a receive path fault is isolated to the IF amplify & divide unit 40 (s14). However, if a fault condition is not reported, the method concludes, reporting that no fault is present in the entire receive path (s12).

Through such a procedure, fault diagnosis can be performed for three stages of a RF receive path in a CDMA digital cellular base station system. By using a method for a fault diagnosis of a RF receive path in the base station, regularly or irregularly, according to the present invention, fault detection and location among three stages of a receiver path are identified and the diagnosis result is used for maintenance of the system.

While the invention is susceptible to various modifications and alternative forms, specific embodiments thereof have been shown by way of example in the drawings and detected description. It should be understood, however, that the present invention is not limited to the particular forms disclosed, but on the contrary, the intention is to cover all modifications, equivalents, and alternatives falling within the spirit and scope of the invention as defined by the appended claims.

What is claimed is:

1. A method for fault diagnosis of a base station RF receive path having a receive front-end stage, a transceiver unit stage and an IF amplify & divide unit stage comprising the steps of:

connecting said RF receive path to a base station test unit;

supplying a signal to said RF receive path, said signal being transmitted from a test mobile station unit in said base station test unit;

measuring the receive signal level;

establishing a criterion for a fault diagnosis of said RF receive path; and determining whether a fault occurs in said receive front-end stage, said transceiver unit stage and said IF amplify & divide unit stage by stages.

2. A method for fault diagnosis of a base station RF receive path as set forth in claim 1, wherein said signal is received over one of an antenna and a directional coupler of said base station system and said receive signal level is measured in said transceiver unit.

3. A method for fault diagnosis of a base station RF receive path as set forth in claim 1, wherein said fault diagnosis can be performed in said base station system only when said base station has no call currently connected.

4. A method for fault diagnosis of a base station RF receive path as set forth in claim 3, wherein a newly measured value from said transceiver unit is performed if one of said receive front-end stage and said transceiver unit is abnormal.

5. A method for fault diagnosis of a base station RF receive path as set forth in claim 4, wherein said newly measured value is an IF output signal level.

6. A method for a fault diagnosis of a base station RF receive path as set forth in claim 5, wherein said transceiver unit senses said IF output signal level and outputs said level as a corresponding voltage signal.

7. A method for fault diagnosis of a base station RF receive path as set forth in claim 6, wherein comparison of a normal IF voltage-level with a current IF output voltage level from said transceiver unit is used to isolate a fault in one of said receive front-end stage and said transceiver unit.

8. A method for fault diagnosis of a base station RP receive path as set forth in claim 7, wherein a fault is diagnosed in said receive front-end stage if said IF output voltage-level is normal, while in said transceiver unit stage if said IF output voltage-level is abnormal.

9. A method for fault diagnosis of a base station RF receive path as set forth in claim 8, wherein a further fault diagnosis operation is performed in said IF amplify & divide unit stage if no fault is detected in said receive front-end and said transceiver unit.

10. A method for fault diagnosis of a base station RF receive path as set forth in claim 9, wherein a difference between normal automatic gain control voltage and abnormal automatic gain control voltage is used for diagnosing a fault in said IF amplify & divide unit stage, the automatic gain control voltage being outputted from an automatic gain controller connected to said IF amplify & divide unit stage.

11. A method of fault diagnosis of a RF receive path in a cellular base station comprising the steps:

storing an expected baseline RF signal level and a measured baseline IF signal level from a known input signal;

measuring an RF signal level and comparing said RF signal level to said expected RF signal level to determine an RF difference level;

measuring a subsequent IF signal level if said RF difference level exceeds a predetermined threshold value;

comparing said subsequent IF signal level to said baseline IF signal level to determine an IF difference level;

measuring an AGC output signal for an IF stage if said RF difference level does not exceed said predetermined threshold value; and evaluating said RF difference level, said IF difference level and said AGC output signal to determine if a fault is present and isolating a present fault to one of a RF front end stage, a transceiver unit stage and an IF stage in the receiver path of the base station.

12. A method of fault diagnosis of a RF receive path as defined by claim 11, wherein said predetermined threshold value is about 10 dB.

13. A method of fault diagnosis of a RF receive path as defined by claim 11, wherein said measuring steps are performed using an analog to digital converter in a transceiver unit within the cellular base station.

14. A method of fault diagnosis of a RF receive path as defined by claim 11, wherein a fault is identified in the RF front end stage if said RF difference level exceeds said threshold value and if said IF difference level is below a second threshold value.

15. A method of fault diagnosis of a RF receive path as defined by claim 11, wherein a fault is identified in the transceiver unit stage if said RF difference level exceeds said threshold value and if said IF difference level is at least equal to a second threshold value.

16. A method of fault diagnosis of a RF receive path as defined by claim 11, wherein a fault is identified in the IF stage if said RF difference level does not exceed said threshold value and if said AGC output signal indicates a fault condition.

17. A method of fault diagnosis of a RF receive path as defined by claim 11, wherein:

a fault is identified in the RF front end stage if said RF difference level exceeds said threshold value and if said IF difference level is below a second threshold value;

a fault is identified in the transceiver unit stage if said RF difference level exceeds said threshold value and if said IF difference level is at least equal to said second threshold value; and a fault is identified in the IF stage if said RF difference level does not exceed said threshold value and if said AGC output signal indicates a fault condition.

18. A system for fault diagnosis of a RF receive path in a cellular base station comprising:

means for storing an expected baseline RF signal level and a measured baseline IF signal level from a known input signal;

means for measuring an RF signal level and comparing said RF signal level to said expected RF signal level to determine an RF difference level;

means for measuring a subsequent IF signal level if said RF difference level exceeds a predetermined threshold value;

means for comparing said subsequent IF signal level to said baseline IF signal level to determine an IF difference level;

means for measuring an AGC output signal for an IF stage if said RF difference level does not exceed said predetermined threshold value; and means for evaluating said RF difference level, said IF difference level and said AGC output signal to determine if a fault is present and isolating a present fault to one of a RF front end stage, a transceiver unit stage and an IF stage in the receiver path of the base station.

19. A system for fault diagnosis of a RF receive path in a cellular base station as defined by claim 18, wherein:

a fault is identified in the RF front end stage if said RF difference level exceeds said threshold value and if said IF difference level is below a second threshold value;

a fault is identified in the transceiver unit stage if said RF difference level exceeds said threshold value and if said IF difference level is at least equal to said second threshold value; and a fault is identified in the IF stage if said RF difference level does not exceed said threshold value and if said AGC output signal indicates a fault condition.

20. A system for fault diagnosis of a RF receive path in a cellular base station as defined by claim 19, wherein said predetermined threshold value is about 10 dB.

* * * * *